(12) United States Patent
Chew

(10) Patent No.: US 9,965,697 B2
(45) Date of Patent: May 8, 2018

(54) HEAD POSE DETERMINATION USING A CAMERA AND A DISTANCE DETERMINATION

(71) Applicant: INTEL CORPORATION, Santa Clara, CA (US)

(72) Inventor: Yen Hsiang Chew, Georgetown (MY)

(73) Assignee: INTEL CORPORATION, Santa Clara, CA (US)

( * ) Notice: Subject to any disclaimer, the term of this patent is extended or adjusted under 35 U.S.C. 154(b) by 325 days.

(21) Appl. No.: 14/715,080

(22) Filed: May 18, 2015

(65) Prior Publication Data

US 2016/0343138 A1    Nov. 24, 2016

(51) Int. Cl.
G06K 9/52      (2006.01)
G06T 7/73      (2017.01)
G06F 3/01      (2006.01)

(52) U.S. Cl.
CPC ............ *G06K 9/52* (2013.01); *G06F 3/012* (2013.01); *G06F 3/013* (2013.01); *G06T 7/73* (2017.01); *G06T 2207/30201* (2013.01)

(58) Field of Classification Search
CPC  G06F 3/012; G06F 3/013; G06K 9/52; G06T 7/73
See application file for complete search history.

(56) References Cited

U.S. PATENT DOCUMENTS

| | | | | |
|---|---|---|---|---|
| 4,669,836 A * | 6/1987 | Richardson | ............... | A61B 3/14 351/206 |
| 4,974,092 A * | 11/1990 | Kawamura | ........ | H04N 5/23212 348/349 |
| 9,395,562 B1 * | 7/2016 | Nguyen | ................ | G02C 13/005 |
| 2009/0177528 A1 * | 7/2009 | Wu | ......... | G06Q 30/02 705/14.44 |
| 2011/0074925 A1 * | 3/2011 | Turner | .................... | G06T 13/20 348/46 |
| 2011/0304640 A1 * | 12/2011 | Noge | .................... | G06T 19/006 345/589 |
| 2012/0194693 A1 * | 8/2012 | Samadani | ............... | H04N 7/142 348/222.1 |
| 2014/0204193 A1 * | 7/2014 | Zhang | ................ | G06K 9/00597 348/78 |
| 2014/0232881 A1 * | 8/2014 | Plaehn | ............... | H04N 5/23212 348/207.1 |

* cited by examiner

*Primary Examiner* — Peter D Le
(74) *Attorney, Agent, or Firm* — Grossman Tucker Perreault & Pfleger, PLLC

(57) ABSTRACT

An object that has attracted a viewer's interest is determined using head pose and distance information. In one example a viewer's head is detected at a camera of a computing system. A distance from the head to the camera is determined. A pose of the head is determined as a yaw angle of the head. A location is determined using the distance and the yaw angle, and an object of attention is determined using the location.

20 Claims, 5 Drawing Sheets

HEAD POSE DETERMINATION USING A CAMERA AND A DISTANCE DETERMINATION

FIELD

The present description relates to head pose determination using a camera and, in particular determining a person's direction of attention.

BACKGROUND

Eye contact is a key part of human interaction. People look in each other's eyes to determine interest and distraction. A human interaction with a machine can feel more natural or more human, when the machine is able to determine what the human is looking at. This may be used primarily to determine where the human's attention is directed. If a person is looking at a machine interface, then the machine can use this information to provide an appropriate response. When the person is looking away, then the machine can wait for the person's attention to return or can call to the person to return. If the person is looking at a particular object, then the machine can present some interaction with that object.

In several systems, a person's direction of attention is determined by observing the person's eyes through a camera and then analyzing images of the eyes to determine a direction for the person's pupils. Since eyes generally have a white background with a dark iris and even darker pupil, the position of the pupil can be determined with relative ease. The eye direction or gaze direction may then be used as in input into a user interface or used as a user interaction.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

The gaze of a user or participant may be tracked by tracking the direction of the person's pupils within the eyes. This works well for a single person that is within a meter or less of a camera sensor. It requires that the machine's camera sensor be focused on the person's eyes in order to determine the gaze direction and then to have enough speed and resolution to track movement.

If the person is looking away from the machine's camera, then in order to determine what other object has the person's focus, the machine must know the positions of possible objects and the position of the person's eyes relative to the computer or other objects. Some default user position may be assumed for a notebook computer for example, where the person is likely to be positioned directly in front of the device at a standard working position. However, if observed users may be in many different positions, then the system cannot determined the object that has the person's focus.

When there are multiple persons and when even a single person is not within a close proximity of the machine's camera, then it is difficult to follow the person's eyes to determine a gaze. When there are multiple viewers, then it is difficult to track the gaze because the camera must be focused on the eyes of multiple viewers at the same time. These eyes may also be farther away and harder to resolve.

For viewers that are some distance from the machine, the position of the viewer's head may be used. This is often referred to as pose. By observing a person's face and assuming that the face is symmetric, the pose of the face can be determined in three dimensions e.g. roll, pitch, and yaw. Typically, when a person looks at an object from a distance, the person will turn the whole head toward the object and not just the eyes or gaze. While the pose will not provide information about a fleeting glance, it will normally provide information about a long look.

Figure 1:
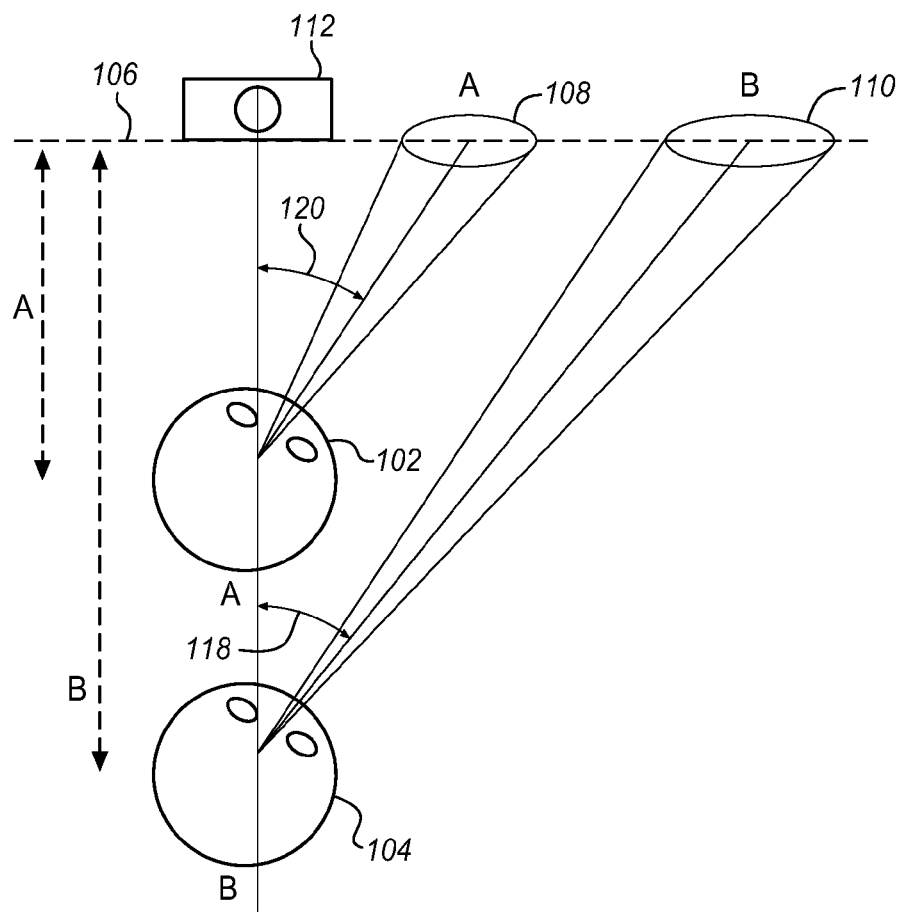
FIG. 1 is a top view diagram of a camera and two viewers to show cones of view based on head pose according to an embodiment.

An object of a person's attention and the person's head orientation or pose may be correlated using the distance between possible objects of attention and the user's head. The distance may be determined using a dual sensor camera or any other type of distance system. FIG. 1 is a top view diagram of a first 102 and second 104 person that are focusing on a first 108 or a second 110 object of attention. The objects 108, 110 are aligned on a viewing plane 106. The first and second person are being observed by a camera 112. The persons may be computer system users, television viewers, viewers of a large scale display or point of sale system, players in a computer system or console game, etc. For convenience, they will be referred to as viewers, however, this is not intended to limit the uses and applications of the system.

As shown, the first viewer 102 is looking toward the first object of attention 108 on the viewing plane. The viewer's direction of attention may be determined by the yaw angle 120 of the viewer's head relative to the camera sensor 112. The diagram shows only distance from the camera to the first object of attention in one direction. The horizontal direction along the viewing plane. In the same way the viewer's direction of attention vertically along the viewing plane may be determined using a pitch angle of the viewer's head. The roll angle may also be used but is not necessary to determine a horizontal and vertical position on the viewing plane.

The second viewer 104 shows a yaw angle 118 with the same magnitude, however the second viewer is farther from the camera and the viewing plane than the first viewer. As a result, while the direction for the head is the same, this angle corresponds to a different position on the viewing plane. The second object of attention 110 has a larger horizontal distance from the camera than the first object of attention 108.

As shown, the actual cone of view or object of attention cannot be determined accurately without knowing the distance from the viewing plane to the viewer. For a desktop system, the distance may be estimated based on a correct ergonomic viewing position. In other words, a typical computer workstation is designed to be operated by a user in a particular position. These distances are typically about one meter from the display. However, for a larger scale system or for other types of systems, the viewer's position may vary. The distance may be estimated between the user and an object of attention may be based on the relative size of the viewer's head. However, different people have different sized heads.

Some camera systems use multiple sensors to provide depth perception. Other camera systems augment a single camera with an infrared, laser, or ultrasonic rangefinder system. These depth measurements do not depend on any assumptions about characteristics of a particular viewer. Such a distance measurement may be applied to the techniques described herein. The depth information allows the head pose to be mapped to a direction of attention and then to the viewing plane. This viewing plane may coincide with the camera position or it may be separate and apart from the camera. This may all be done without typical gaze or eye direction information. The direction of attention may be rendered as a cone of view rather than a single eye direction. This may be done because a viewer will typically turn his head toward an object of interest before focusing his eyes on the object. This is especially true for large objects (e.g. a media player display, a garment, a displayed product, a museum exhibit, etc.) from a distance of 0.5 meters or more.

The accuracy of the object of attention determination may be improved by then determining a gaze or eye direction. This may allow the cone of view to be narrowed. As an example, a cone of view may first be determined as described herein. The system may then zoom-in on a particular detected viewer and determine an eye direction for a more precise interaction.

In some embodiments, a system may use a dual mode head pose tracking and gaze tracking technique. As an example, when a viewer's face is relatively close to a camera sensor, a conventional eye tracking method may be used. However, when the viewer moves away from the camera sensor to a distance of e.g. more than 0.5 meters from a camera sensor, the system switches to a head pose method using depth information. At this distance, the viewer's gaze is more difficult to track from eye direction information. The distance to the viewer's face may be measured using a depth sensor of the camera sensor.

In the simple example of FIG. 1, the viewers are directly in front of the camera and the camera is on the viewing plane. This allows the horizontal distance on the viewing plane to be determined by solving for the right triangle. Using the distance from the camera and the yaw angle, the horizontal distance from the camera sensor may be determined.

The yaw angle determination for a viewer's head has some uncertainty. In addition the viewer has a range of vision and attention within any particular head pose. In other words, when a person's head is pointed in a particular direction, there is viewing range that the user may exercise without moving the head. The measurement uncertainty and user behavior may be estimated as a yaw angle range. For the two viewers, there is a range on both sides of the determined yaw angle. This range is mapped to the viewing plane to show a range of horizontal distance. The same technique may be used to determine a pitch angle range that is mapped to a range of vertical distance. The combination of horizontal and vertical range results in a cone of view on the viewing plane. The system can apply the determined cone of view to a knowledge of objects in the viewing plane to determine the viewer's object of attention. The objects may be real or virtual.

The cone of view has a range that takes into account the possible eye positions of a person at a particular head pose. A more precise direction of attention for a person may be determined using three increasingly more precise parameters. First the actual position of the person is determined. This can be a distance measurement relative to a camera source. Second, the head pose of the person is determined. This gives the cone of view of the person's attention. Third, the eye position is determined. This further narrows the cone of view to a particular section within the cone.

There are variety of different techniques for determining the yaw and pitch of a human head using single camera. In many techniques, the human face is assumed to have bilateral symmetry. The center of the face is determined by finding the nose, by finding a middle point between the eyes and the corners of the mouth. These facial landmarks are then used to draw lines between facial features. If the face is pointed to one side, then from the perspective of the camera, the eye on one side will appear closer to the nose than the other eye. Since most faces are not perfectly symmetrical, multiple measurements may be taken using multiple facial landmarks to improve the accuracy of the estimate. Any of a variety of different techniques may be used to determine head pose and especially yaw and pitch for use as described herein.

Figure 2:
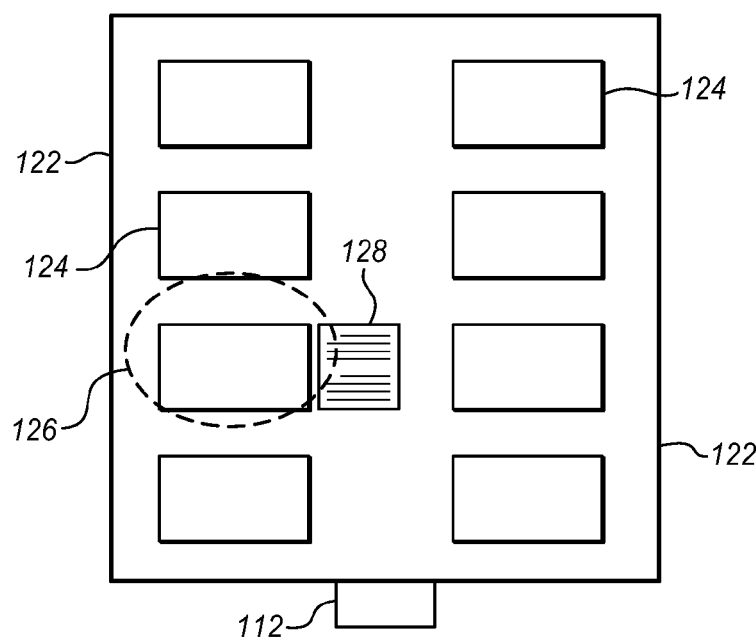
FIG. 2 is a diagram of a camera and a display to show cones of view for a viewer and a response to a determined cone of view according to an embodiment.

FIG. 2 is a diagram of an example display for presentation in the viewing plane. The display 122 is substantially flat in the plane of the drawing sheet. The plane corresponds to the viewing plane and extends horizontally and vertically. There is a camera 112 horizontally centered below the display. With some display technologies, the camera may be located directly in the center of the display for simpler and more accurate pose determinations, however, the camera need not be centered horizontally or vertically. The camera may be offset in any direction from the display.

The display 122 presents different objects 124 to attract the user's attention. These objects may be images of real objects, videos, icons, words, or any other type of presented image. A viewer's cone of view has been mapped to a cone 126 of positions on the display based, for example on the angle and distance determinations described herein. As a use case example, after the system determines the cone of view, the system then maps the cone of view to a displayed object. In response to the user focusing on one of the objects as the user's object of attention, the system then presents a response 128 to the viewer. This response may be information about the object, such as product information, promotions, availability, further details, etc.

In brief, the system accurately correlates head pose to a specific location in space. This allows the system to know a specific location or a more general area of attention of a person on a screen and relate that to an object at which the person is looking. The system may then interact or respond appropriately to that person.

For a digital signage system, an advertiser is able to gather information on products that attract viewer attention or interest. The digital signage may also interact with a viewer by displaying product information and promotions to encourage the person to purchase the product. The same approach may be used for a retail display of real objects on shelf or display wall or for display articles at a museum, memorial, or informational display.

For a computer or digital assistant system, the object of attention may be tracked for a person in front of a screen. This allows a digital assistant to gather information about the viewer's interests and personalize media contents and game interactions for better user experience.

For a set-top box scenario, the different objects may be different media, such as videos, song titles, actors, or other audio and video features. When the viewer focuses attention on a particular thumbnail, the system may present a preview or the full feature. For an icon, the system may launch an application or connect with a particular contact.

In an in-vehicle system, the direction of attention may also be used to activate vehicle components. The system may also be able to determine whether the driver is paying attention to the road and objects outside the road. This information may be used for various safety applications.

Figure 3:
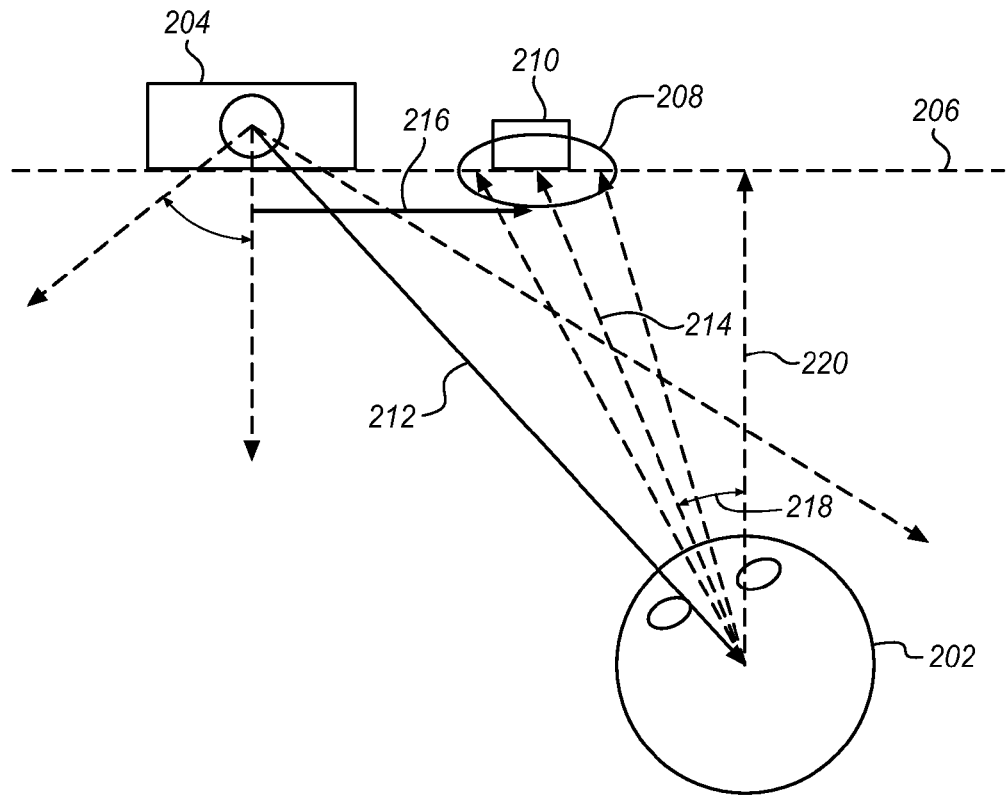
FIG. 3 is a top view diagram of a camera and a viewer to show determining a cone of view based on head pose according to an embodiment.

FIG. 3 is a diagram of a viewer looking at an object in a viewing plane. The viewer is not centered in front of a camera, however, a similar approach may be used for a viewer in any position within the field of view of the camera. A technique for determining a cone of view for the viewer is described. The viewer 202 is in front of a viewing plane 206. The viewing plane may be an active display such as a viewing or projection screen or it may be a display of real items, such as products for sale or display. The viewer is observed by a camera 204, which in this example is positioned in the viewing plane. The viewer has directed his head to an object of attention 210 which is within a cone of view 208. The viewer is analyzed to determine a location to which the viewer's attention is directed. The location in this case is on the viewing plane, but the location may be in front of or behind the viewing plane. The determined location is then mapped to an object in the space to determine what the viewer is looking at. Distances and angles are also shown from which the cone of view may be determined. The cone of view may be used to identify the object of attention 210.

A camera vector 212 is given by a vector from the camera 204 to the viewer. The camera vector includes an angle of the head from the centerline of the view of the camera and an absolute distance from the camera directly to the head. An object vector 214 is given by a vector from the object on the view plane to the viewer. The object vector includes the yaw angle 218 of the head relative to a normal 220 from the viewing place and an absolute difference from the head to the location of the viewer's attention. The sum of these vectors provides the x-component 216 for the location of attention, i.e. the horizontal distance from the camera to the location of attention. This location can then be mapped to a particular object.

Figure 4:
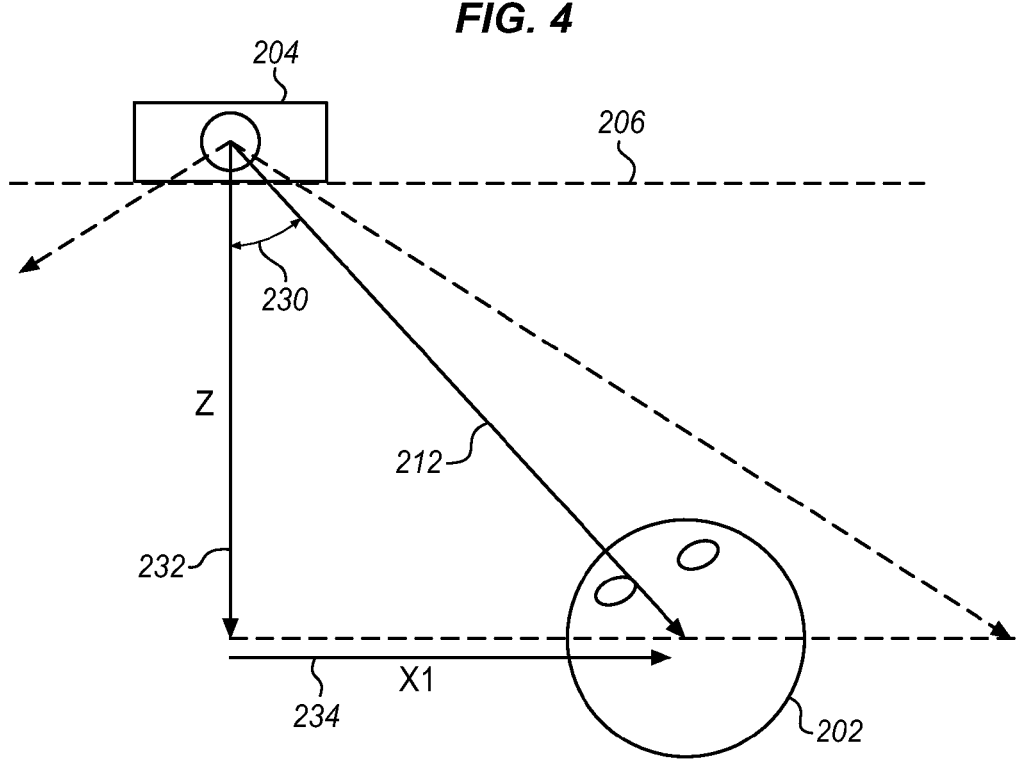
FIG. 4 is a top view diagram of a camera and a viewer to show determining a camera vector according to an embodiment.

FIG. 4 is a simplified diagram of the same scene as in FIG. 3 to show how the camera vector may be determined in an embodiment. The camera vector 212 can be separated into its x and z components 234, 232, wherein x and y are horizontal and vertical direction as defined by the plane of the viewing plane 206 and z is distance from the viewing plane. The diagrams of the FIGS. 3, 4, and 5, portray a three-dimensional space in Cartesian coordinates with the camera at the center. The camera is in a camera view plane and all of the objects of attention are in the same viewing plane. The viewer is displaced from the viewing plane by a depth, distance, or z-offset. The x-component and z-component or the viewer's position in this space may be determined using a camera angle 230 and depth 212 or distance from the viewer to the camera.

Many camera systems may be configured to determine a camera view angle 230 for an object in the camera's field of view. The camera view angle is the angle by which the viewer is offset from the center of the camera's view. The center is normally defined by a normal line from the camera's imaging sensor. This angle 230 is directly related, for example, to the number of camera pixels between the camera sensor centerline and the position of the viewer. Depth sensing camera sensors may be configured to determine the distance 212 of the viewer from the camera. These two measurements define the direction and magnitude of the camera view vector 212. The parameters of the camera vector may be applied to determine the x (length x1) and z-components (length z) of the viewer using triangle geometry:

$$\text{length } x1 = \text{distance } \cos(\text{view angle}) \quad \text{(Eq. 1)}$$

$$\text{length } z = \text{distance } \sin(\text{view angle}). \quad \text{(Eq. 2)}$$

Figure 5:
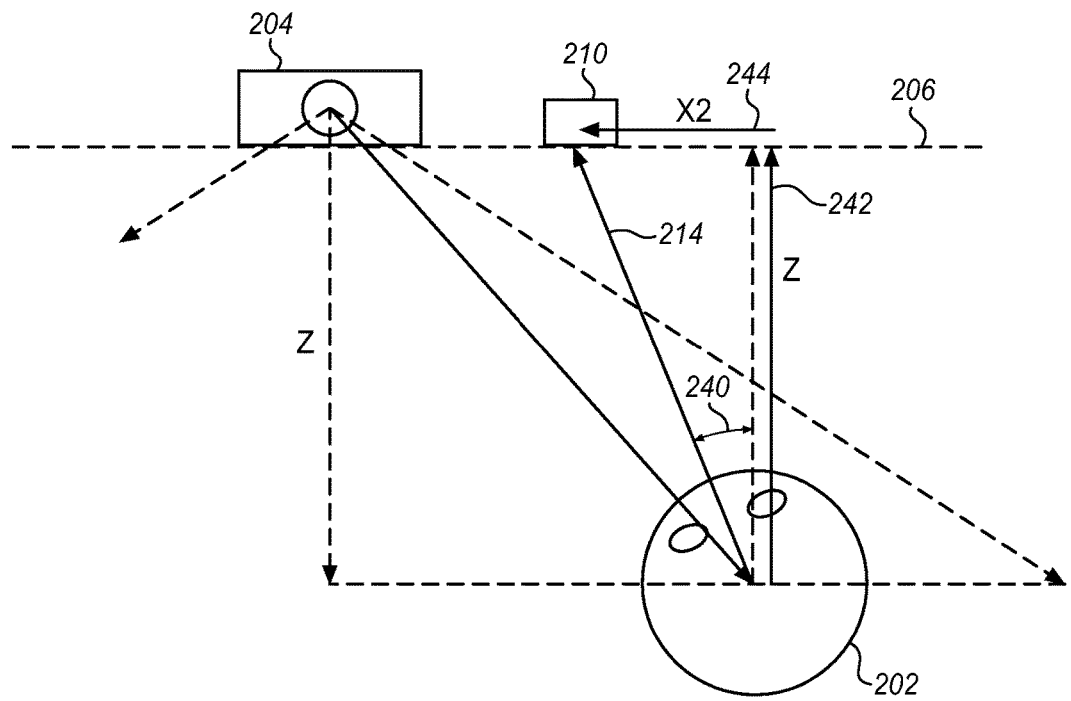
FIG. 5 is a top view diagram of a camera and a viewer to show determining an object vector according to an embodiment.

The x and z-components define the position of the viewer relative to the viewing plane. To determine the viewer's direction of attention, the viewer's head pose is used. The yaw angle is the angle of rotation about the y-direction as used in these diagrams. FIG. 5 is a diagram of the scene of FIG. 3 simplified to show how the object vector 214 may be determined.

The object vector may also be divided into x and z-components. The x-component 244 (length x2) is the distance from the viewer's x position 234 to the x-position of the object of attention. The z-component 242 is the same as that determined in the context of FIG. 4. Using the camera sensor and any of a variety of different techniques, the yaw angle is determined by analyzing facial landmarks and assuming that a viewer's face has bilateral symmetry. The x-component (length x2) 244 of the object vector 214 may be computed from the earlier z distance and the yaw angle using triangle geometry:

$$\text{length } x2 = \text{length } z \tan(\text{yaw angle}). \quad \text{(Eq. 3)}$$

Figure 6:
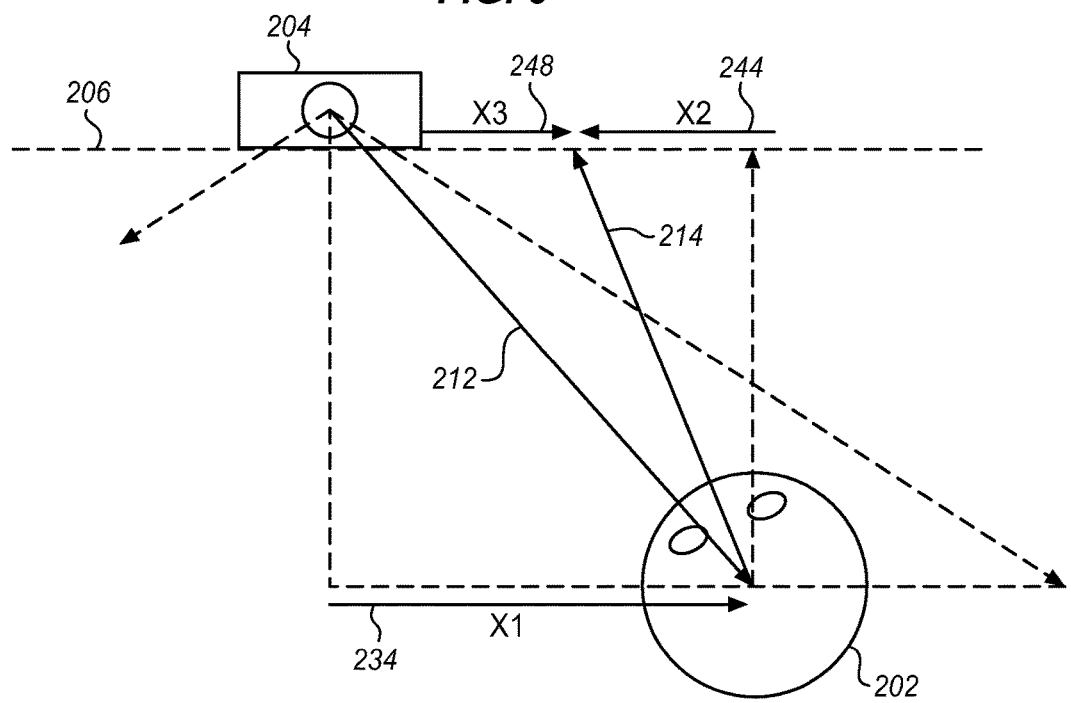
FIG. 6 is a top view diagram of a camera and a viewer to show determining an object location on a plane according to an embodiment.

The x-component 216 (length x3) of the object of the attention may then be determined by comparing the x-component (x2) 244 of the object vector 214 to the parallel x-component (x1) 234 of the camera view vector 212 which is the positon of the viewer 202. FIG. 6 is a diagram of the scene of FIG. 4 which is simplified to show determining the x-component 248 of the object of attention. As illustrated:

$$\text{length } x3 = \text{length } x1 + \text{length } x2. \quad \text{(Eq. 4)}$$

The same techniques may be used to determine the y-component of the object of attention. For the y-component, the pitch angle of the viewer's head is used instead of the yaw angle. Having determined both x and y coordinates, the coordinates corresponding to the x and y-components on the viewing plane. This specific location on the viewing plane may then be mapped to a particular object of attention 210. This object may be a section of a screen or a virtual object or a real object.

As shown in FIGS. 2 and 3, the location may be an area indicated as the cone of view 126, 208. The location is approximated by an area because the numerical values for the angles are approximate and because a user may look in a range of directions without moving the head. The cone of view may map onto several different objects as shown in FIG. 2. In this case, the object in the center of the cone of view or the object that most coincides with the cone of view may be chosen.

If the possible objects of attention are tall vertical objects, such as fishing poles, then the y-component may not be necessary and the y-component determination may be skipped. Similarly for long horizontal objects, an x-component determination may not be necessary.

The diagrams show a single camera in the same plane as the objects to be viewed. This may be a convenient configuration for a large video screen, television, digital sign or display wall. However, the camera may be in any other position and there may be more than one camera. There may also be some objects that are not in the same plane as other objects. The same or similar techniques may be used to project the determined coordinates onto the Cartesian space as shown. For more complex object configurations, a different coordinate system or projection system may be used. The addition of depth from the camera to the viewer allows the head pose to be used to determine the user's direction of attention.

As described above, a location of attention may be determined in various ways. An absolute location of a viewer's face or head may be determined by a camera source. In embodiments the camera has a first sensor with a higher resolution RGB sensor and a lower resolution sensor with the same field of view for a depth sensor. A face or head direction angle may be computed using the higher resolution sensor of the same depth-sensing camera source.

As an example, after a face has been detected using the higher resolution sensor, the center of the face is determined. For each detected face, the range or power of the depth sensor is focused on the center of the detected face. This may correspond to temporarily increasing power to a laser or IR emitter focusing only on the center of the detected face in order to have a better distance measurement of the face. Alternatively the whole camera view may be scanned.

With the direction, the pose angle information may be computed for the face. The pose angle information may then be applied to map the viewing location, such as a cone of view, of the face back to a camera plane that intersects the camera. The depth information may be used to aid in this determination. In some embodiment, a cone of view may be used as the gaze location because the eyeball position is not estimated. The cone of view includes possible locations at which a person may be looking with the eyes for any given head location and pose.

Figure 7:
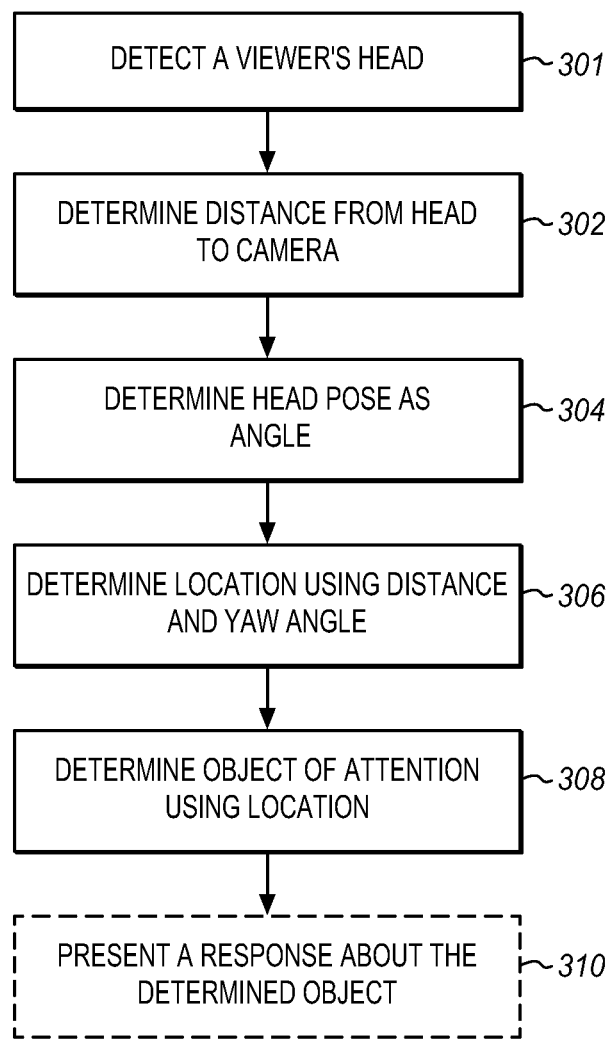
FIG. 7 is a process flow diagram of determining an object of interest using head pose according to an embodiment.

FIG. 7 is a process flow diagram of determining a location of attention using a camera and depth according to an embodiment. The process begins at 301 with detecting a viewer's head at a camera of a computing system. For this detected head a depth sensor associated with the camera determine a distance from the head to the camera at 302. In addition, a pose of the head is determined at 304 as an angle of the head. This angle may be pitch or yaw. While the description of FIGS. 3-6 address the yaw angle, the pitch angle may be used for a vertical determination or both may be used.

At 306 a location is determined using the distance and the yaw angle and any other angles. This location may be on a viewing plane and the viewing plane may or may not be associated with the camera. At 308, using this location an object of attention may be determined. At 310, the system may optionally present a response to the viewer based on the determined object.

The object of attention may be used in a variety of different ways. An identification of the object may simply be recorded. The object ID may be recorded together with a time duration for how long the user's attention was directed to the object. For a more interactive experience the system may present a response to the viewer regarding the object. The response may be to present information about the object. For a video, the response may be rendering the video on a display. For a product, the response may be presenting advertising information about the product. A variety of other responses may be presented as well.

In another example, the object of attention may be a virtual object presented on a display, through a display, or through a wearable device. The response to the determining the object of attention may be to animate the virtual object. Such an interaction may be used for education or game play. As an example, a field of view may contain multiple virtual objects displayed in a real scene. When the user looks at a virtual object this object may come to life in terms of performing a behavior or an interaction.

With interactive digital signage, the described techniques may be used to estimate the direction of attention for multiple viewers. This direction may be used to determine which signage screens or which section of an extended signage screen is being looked at by a viewer. This information may be used to determine which signage content attracts the interest of the viewers that come upon the sign. This may be used to gather video analytics to better manage and add value to advertisement content and for other purposes. In the same way the system may determine the products in a shopping aisle that are attracting attention. The products that shoppers are looking can be compared to those which shoppers are buying.

In such IoT (Internet of Things) and digital signage use cases, such as shopping malls, exhibits, museums, tourist sites, it may be difficult to place a camera sensor within eye tracking distance to a viewer's face. It may also be difficult to pre-focus a camera sensor onto a viewer's eyes. Using the head pose may offer a much faster and efficient gaze direction estimation in a public environment for interactive digital signage and shopper attention data gathering.

In home entertainment systems or smart televisions (TVs), a TV mounted camera may not be close enough or may not be pre-focused quickly enough to track the eyes of viewers. The described techniques enhance the user experience and may be used to add medium range attention tracking to enhance the user experience during gameplay. The attention tracking may also be added to digital home entertainment system or smart TV systems to generate viewer analytics data. This data may be used to estimate viewer media interests and preferences. this data may be used to enhance the viewer's user experience in media consumption.

Figure 8:
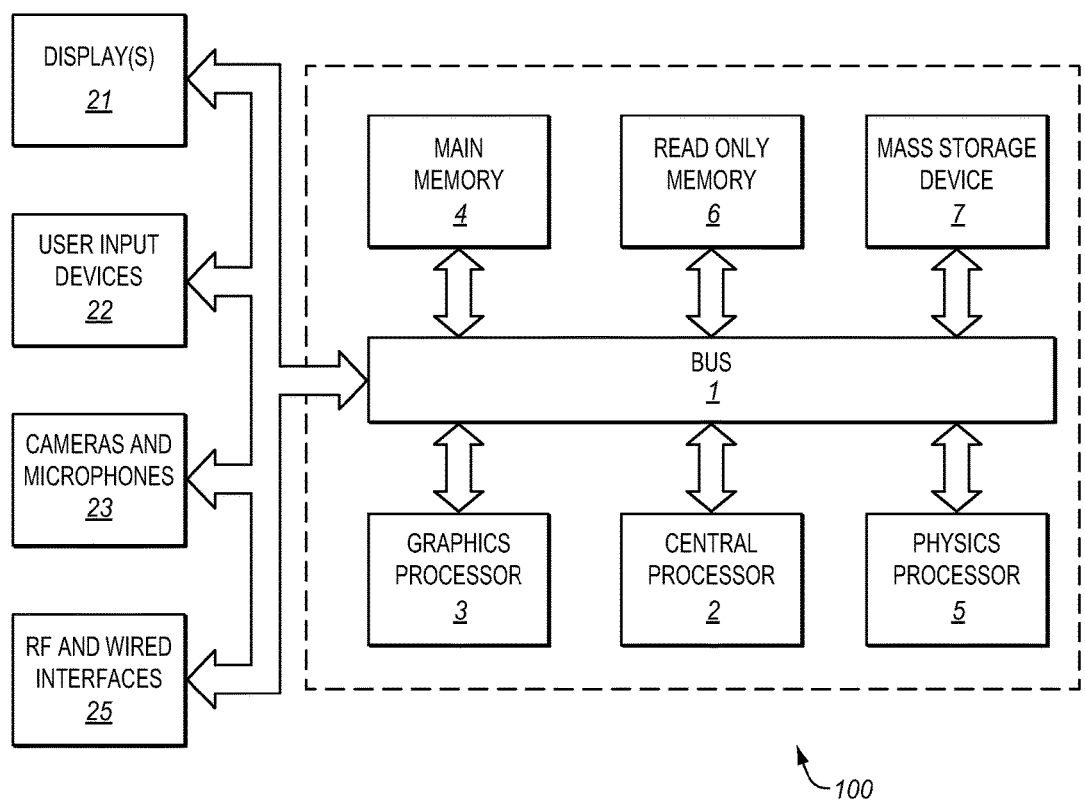
FIG. 8 is a block diagram of a computing system for determining an object of interest according to an embodiment.

FIG. 8 is a block diagram of a computing system 100 suitable for use as the attention tracking and data analytics device described above, such as a personal computer, tablet or slate computer, gaming console, digital signage or Internet of Things device.

The attention tracking device computer system 100 includes a bus or other communication means 1 for communicating information, and a processing means such as a microprocessor 2 coupled with the bus 1 for processing information. The computer system may be augmented with a graphics processor 3 specifically for rendering graphics through parallel pipelines and an imaging or physics processor 5 or other specialized processor for analyzing images and interactions between objects and images as described above. These processors may be incorporated into the central processor 2 or provided as one or more separate processors.

The computer system 100 further includes a main memory 4, such as a random access memory (RAM) or other dynamic data storage device, coupled to the bus 1 for storing information and instructions to be executed by the processor 2. The main memory also may be used for storing temporary variables or other intermediate information during execution of instructions by the processor. The computer system may also include a nonvolatile memory 6, such as a read only memory (ROM) or other static data storage device coupled to the bus for storing static information and instructions for the processor.

A mass memory 7 such as a magnetic disk, optical disc, or solid state array and its corresponding drive may also be coupled to the bus of the computer system for storing information and instructions. The computer system may also be coupled via the bus to a display device or monitor 21, such as a Liquid Crystal Display (LCD) or Organic Light Emitting Diode (OLED) array, for displaying information to a user including objects and responses to the user about objects. For example, graphical and textual indications of information may be presented to the user on the display device, in addition to the various views of objects of interest as described above.

Typically, user input devices 22, such as a keyboard with alphanumeric, function and other keys may be coupled to the bus for communicating information and command selections to the processor. Additional user input devices may include a cursor control input device such as a mouse, a trackball, a trackpad, touchscreen sensor, or cursor direction keys can be coupled to the bus for communicating direction information and command selections to the processor and to control cursor movement on the display 21.

Camera and microphone arrays 23 are coupled to the bus to capture viewers, capture head pose, and capture other viewer interaction. The cameras and microphones may also be used to receive commands in the form of gestures, spoken audio, and other types of user input.

Communications interfaces 25 are also coupled to the bus 1. The communication interfaces may include a modem, a network interface card, or other well-known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the exemplary systems will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes detecting a viewer's head at a camera of a computing system, determining a distance from the head to the camera, determining a pose of the head as a yaw angle of the head, determining a location using the distance and the yaw angle, and determining an object of attention using the location.

Further embodiments include presenting a response to the viewer regarding the object.

In further embodiments the response comprises information about the object.

In further embodiments the object of attention comprises a video and the response comprises rendering the video on a display.

In further embodiments the object of attention comprises a virtual object and the response comprises animating the virtual object.

In further embodiments the object of attention comprises a product and the response comprises presenting advertising information about the product.

In further embodiments the camera comprises multiple sensors and wherein determining a distance comprises using depth perception of the multiple sensors.

In further embodiments determining a distance comprises using a laser rangefinder.

Further embodiments include determining a pitch angle of the head and wherein determining a location comprises using the distance, the yaw angle, and the pitch angle.

In further embodiments the camera is positioned on a viewing plane, the method also include determining a camera angle as an angle of the head from the centerline of the camera field of view and determining a distance includes determining an absolute distance from the camera to the head, determining a distance from the viewing plane to the head, and determining a distance along the viewing plane from the camera to the head.

In further embodiments the camera is positioned on a view plane and wherein determining a location comprises determining a location on the view plane using the distance, the yaw angle, and an angle between a centerline of the camera field of view and the head.

In further embodiments determining the location comprises determining a cone of view on the view plane.

In further embodiments the object is on a view plane wherein determining a pose comprises determining a camera vector from the camera to the head, wherein determining a yaw angle comprises determining an object vector from the head to the viewing plane, and wherein determining a location comprises comparing the first component of the camera vector in the view plane to a second parallel component of the object vector in the view plane.

Some embodiments pertain to a machine-readable medium having instructions that when operated on by the machine cause the machine to perform operations that include detecting a viewer's head at a camera of a computing system, determining a distance from the head to the camera, determining a pose of the head as a yaw angle of the head, determining a location using the distance and the yaw angle, and determining an object of attention using the location.

Further embodiments include determining a pitch angle of the head and determining a location comprises using the distance, the yaw angle, and the pitch angle.

In further embodiments the camera is positioned on a viewing plane, the operations also include determining a camera angle as an angle of the head from the centerline of the camera field of view and determining a distance includes determining an absolute distance from the camera to the head, determining a distance from the viewing plane to the head, and determining a distance along the viewing plane from the camera to the head.

In further embodiments the camera is positioned on a view plane and wherein determining a location comprises determining a location on the view plane using the distance, the yaw angle, and an angle between a centerline of the camera field of view and the head.

Some embodiments pertain to an apparatus that includes a camera to detect a viewer's head and to determine a distance from the head to the camera, and a processor to determine a pose of the head as a yaw angle of the head, to determine a location using the distance and the yaw angle, and to determine an object of attention using the location.

Further embodiments include a display, wherein the object is an item rendered on the display and the processor is further to generate a response to be rendered on the display is to the viewer regarding the object.

In further embodiments the camera comprises multiple sensors and wherein determining a distance comprises using depth perception of the multiple sensors.

In further embodiments the object is on a view plane determining a pose includes determining a camera vector from the camera to the head, determining a yaw angle comprises determining an object vector from the head to the viewing plane, and determining a location comprises comparing the first component of the camera vector in the view plane to a second parallel component of the object vector in the view plane.

What is claimed is:

1. A method to determine an object of interest, the method comprising:
   detecting, using a camera, a head of a person viewing a display plane including the object of interest;
   determining, using the camera, a distance from the head to the camera;
   determining, using the camera, a yaw angle of the head with respect to a normal extending from the display plane;
   determining, using a processor, an area of attention of the person on the display plane by:
      determining a camera vector based on an angle of the head from a centerline of a camera field of view of the camera and the determined distance;
      determining an object vector based on the yaw angle and a distance from the head to the area of attention; and
      determining the area of attention on the display plane based on the camera vector and the object vector; and
   determining, using the processor, the object of interest based on the area of attention.

2. The method of claim 1, further comprising presenting a response to the person regarding the object of interest.

3. The method of claim 2, wherein the response comprises information about the object of interest.

4. The method of claim 2, wherein the object of interest comprises a video and the response comprises rendering the video on a display.

5. The method of claim 2, wherein the object of interest comprises a product and the response comprises presenting advertising information about the product.

6. The method of claim 2, wherein the object of interest comprises a virtual object and the response comprises animating the virtual object.

7. The method of claim 1, wherein the camera comprises multiple sensors and wherein the distance from the head to the camera is determined using depth perception of the multiple sensors.

8. The method of claim 1, wherein the distance from the head to the camera is determined using a laser rangefinder.

9. The method of claim 1, wherein a pitch angle of the head is determined using the camera.

10. The method of claim 9, wherein the area of attention is determined using the determined distance, the yaw angle, and the pitch angle.

11. The method of claim 10, wherein the camera is positioned on the display plane, the method further comprising determining the angle of the head from the centerline of the camera field of view as a camera angle and wherein determining the distance from the head to the camera comprises:
   determining a distance from the display plane to the head of the person along the normal extending from the display plane; and
   determining a distance along the display plane from the camera to the head of the person.

12. The method of claim 1, wherein the camera is positioned on the display plane and wherein determining the area of attention comprises determining a location on the display plane using the determined distance, the yaw angle, and the angle between the centerline of the camera field of view and the head.

13. The method of claim 12, wherein determining the area of attention comprises determining a cone of view on the display plane.

14. The method of claim 1, wherein determining the area of attention further comprises comparing a first component of the camera vector in the display plane to a second parallel component of the object vector in the display plane.

15. At least one non-transitory machine-readable medium having stored thereon instructions that when operated on by one or more processors cause the one or more processors to execute operations, the operations comprising:
   detecting, using a camera, a head of a person viewing a display plane including at least one object of interest;
   determining, using the camera, a distance from the head to the camera;
   determining, using the camera, a yaw angle of the head with respect to a normal extending from the display plane;
   determining, using the one or more processors, an area of attention of the person on the display plane by:
      determining a camera vector based on an angle of the head from a centerline of a camera field of view of the camera and the determined distance;
      determining an object vector based on the yaw angle and a distance from the head to the area of attention; and
      determining the area of attention on the display plane based on the camera vector and the object vector; and
   determining, using the one or more processors, the at least one object of interest based on the area of attention.

16. The at least one medium of claim 15, wherein the camera is positioned on the display plane, the operations further comprising determining the angle of the head from the centerline of the camera field of view as a camera angle and wherein determining the distance from the head to the camera comprises:
   determining a distance from the display plane to the head along the normal extending from the display plane; and
   determining a distance along the display plane from the camera to the head.

17. The at least one medium of claim 16, wherein the camera is positioned on the display plane and wherein determining the area of attention comprises determining a location on the display plane using the distance, the yaw angle, and the angle between the centerline of the camera field of view and the head.

18. An apparatus comprising:
   a camera configured to:
      detect a head of a person viewing a display plane including at least one object of interest;
      determine a distance from the head to the camera; and
      detect a yaw angle of the head of the person with respect to a normal extending from the display plane; and
   a processor configured to:
      determine a camera vector based on an angle of the head from a centerline of a camera field of view of the camera and the determined distance;
      determine an object vector based on the yaw angle and a distance from the head to an area of attention of the person on the display plane;
      determine the area of attention on the display plane based on the camera vector and the object vector; and
      determine, the at least one object of interest based on the area of attention.

19. The apparatus of claim 18, wherein the camera comprises multiple sensors, and wherein the distance from the head to the camera is determined based on depth perception of the multiple sensors.

20. The apparatus of claim 18, wherein the processor is further configured to determine the area of attention by comparing a first component of the camera vector in the display plane to a second parallel component of the object vector in the display plane.

* * * * *